US010162505B2

(12) United States Patent
Steeves

(10) Patent No.: US 10,162,505 B2
(45) Date of Patent: Dec. 25, 2018

(54) SYSTEM AND METHOD FOR ENABLING CUSTOMIZED NOTIFICATIONS ON AN ELECTRONIC DEVICE

(71) Applicant: BlackBerry Limited, Waterloo (CA)

(72) Inventor: Ryan David Steeves, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 330 days.

(21) Appl. No.: 14/255,452

(22) Filed: Apr. 17, 2014

(65) Prior Publication Data

US 2015/0301838 A1 Oct. 22, 2015

(51) Int. Cl.
| G06F 3/00 | (2006.01) |
| G06F 3/0484 | (2013.01) |
| H04M 3/42 | (2006.01) |
| G06F 9/451 | (2018.01) |
| G06F 3/01 | (2006.01) |
| G06F 3/0481 | (2013.01) |

(52) U.S. Cl.
CPC .......... *G06F 3/04847* (2013.01); *G06F 9/453* (2018.02); *H04M 3/42051* (2013.01); *G06F 3/0481* (2013.01)

(58) Field of Classification Search
None
See application file for complete search history.

(56) References Cited

U.S. PATENT DOCUMENTS

| 7,549,120 B1* | 6/2009 | Griffith | G06Q 10/10 715/231 |
| 2005/0160280 A1* | 7/2005 | Caslin | G06F 21/55 713/189 |
| 2007/0182818 A1* | 8/2007 | Buehler | G08B 13/19602 348/143 |
| 2009/0249247 A1* | 10/2009 | Tseng | H04M 1/72552 715/808 |
| 2010/0062753 A1 | 3/2010 | Wen et al. | |

(Continued)

FOREIGN PATENT DOCUMENTS

| CN | 103369102 A | 10/2013 |
| CN | 103458120 A | 12/2013 |

OTHER PUBLICATIONS

Contacts +—Android Apps on Google Play; Mar. 6, 2013; https://play.google.com/store/apps/details?id=com.contapps.android; retrieved online Mar. 10, 2014.

(Continued)

*Primary Examiner* — Toan H Vu
(74) *Attorney, Agent, or Firm* — Thomas Grzesik; Fleit Gibbons Gutman Bongini & Bianco P.L.

(57) ABSTRACT

A system and method are provided for enabling customized notifications on an electronic device. The method comprises displaying a recommendation on the electronic device to create a custom notification for at least one communication type. The method also comprises enabling the custom notification to be created for the at least one communication type. The recommendation may be determined using usage data associated with the at least one communication type. The custom notification may be created by navigating to a custom notifications user interface. The custom notification may also be created by automatically determining at least one custom notification setting.

20 Claims, 13 Drawing Sheets

(56) References Cited

U.S. PATENT DOCUMENTS

| | | | | |
|---|---|---|---|---|
| 2012/0120105 A1* | 5/2012 | Honda | G06Q 10/109 | 345/634 |
| 2013/0007665 A1* | 1/2013 | Chaudhri | G06F 9/4443 | 715/830 |
| 2013/0110541 A1 | 5/2013 | Eaton, Jr. et al. | | |
| 2013/0151943 A1* | 6/2013 | Zhu | G06F 17/30905 | 715/234 |
| 2013/0159408 A1* | 6/2013 | Winn | G06N 99/005 | 709/204 |
| 2013/0179802 A1* | 7/2013 | Martinazzi | H04L 67/22 | 715/753 |
| 2013/0325948 A1* | 12/2013 | Chen | G06Q 50/01 | 709/204 |
| 2014/0024430 A1* | 1/2014 | Wisler | G07F 17/323 | 463/20 |
| 2014/0074921 A1* | 3/2014 | Poornachandran | G06F 17/30867 | 709/204 |
| 2014/0115491 A1* | 4/2014 | Cullin | G06F 3/0233 | 715/745 |
| 2014/0132405 A1* | 5/2014 | Kiefer | B60W 50/14 | 340/438 |
| 2014/0157171 A1* | 6/2014 | Brust | G06F 17/30554 | 715/771 |
| 2014/0168094 A1* | 6/2014 | Milne | G09B 19/02 | 345/173 |
| 2014/0184422 A1* | 7/2014 | Mensinger | A61B 5/0004 | 340/870.02 |
| 2014/0201675 A1* | 7/2014 | Joo | G06F 3/0481 | 715/784 |
| 2014/0244750 A1* | 8/2014 | Redfern | H04L 67/02 | 709/204 |
| 2014/0258937 A1* | 9/2014 | Lee | G06F 3/0482 | 715/835 |
| 2014/0278629 A1* | 9/2014 | Stephenson | G06Q 10/1091 | 705/7.13 |
| 2015/0061824 A1* | 3/2015 | Suzuki | G06F 3/011 | 340/5.52 |
| 2015/0133098 A1* | 5/2015 | Warr | H04W 4/16 | 455/418 |
| 2015/0160797 A1* | 6/2015 | Shearer | G06F 3/0482 | 715/740 |
| 2015/0187201 A1* | 7/2015 | Yuksel | G06Q 30/0631 | 340/539.13 |
| 2015/0324751 A1* | 11/2015 | Orenstein | G06F 19/3481 | 702/3 |
| 2016/0044091 A1* | 2/2016 | Doumet | H04L 67/10 | 715/745 |
| 2016/0117073 A1* | 4/2016 | Chun | G06F 3/0486 | 715/769 |
| 2016/0147968 A1* | 5/2016 | Coney | G06F 19/3406 | 705/2 |
| 2016/0188181 A1* | 6/2016 | Smith | G06F 3/048 | 715/765 |
| 2016/0275458 A1* | 9/2016 | Meushar | G06Q 10/1095 | |

OTHER PUBLICATIONS

Phonedeck Contacts—Andriod Apps on Google Play; Aug. 27, 2013; https://play.google.com/store/apps/details?id=com.phonedeck.android.cloud; retrieved online Mar. 10, 2014.

iOS Using Do Not Disturb; Sep. 24, 2013; http://support.apple.com/kb/HT5463; retrieved online Mar. 10, 2014.

Chinese Office Action dated Aug. 21, 2017 for Chinese Patent Application No. 201510234004.0.

Chinese Office Action dated Apr. 4, 2018 for Chinese Patent Application No. 201510234004.0.

Chinese Office Action dated Sep. 18, 2018 for Chinese Patent Application No. 201510234004.0.

\* cited by examiner

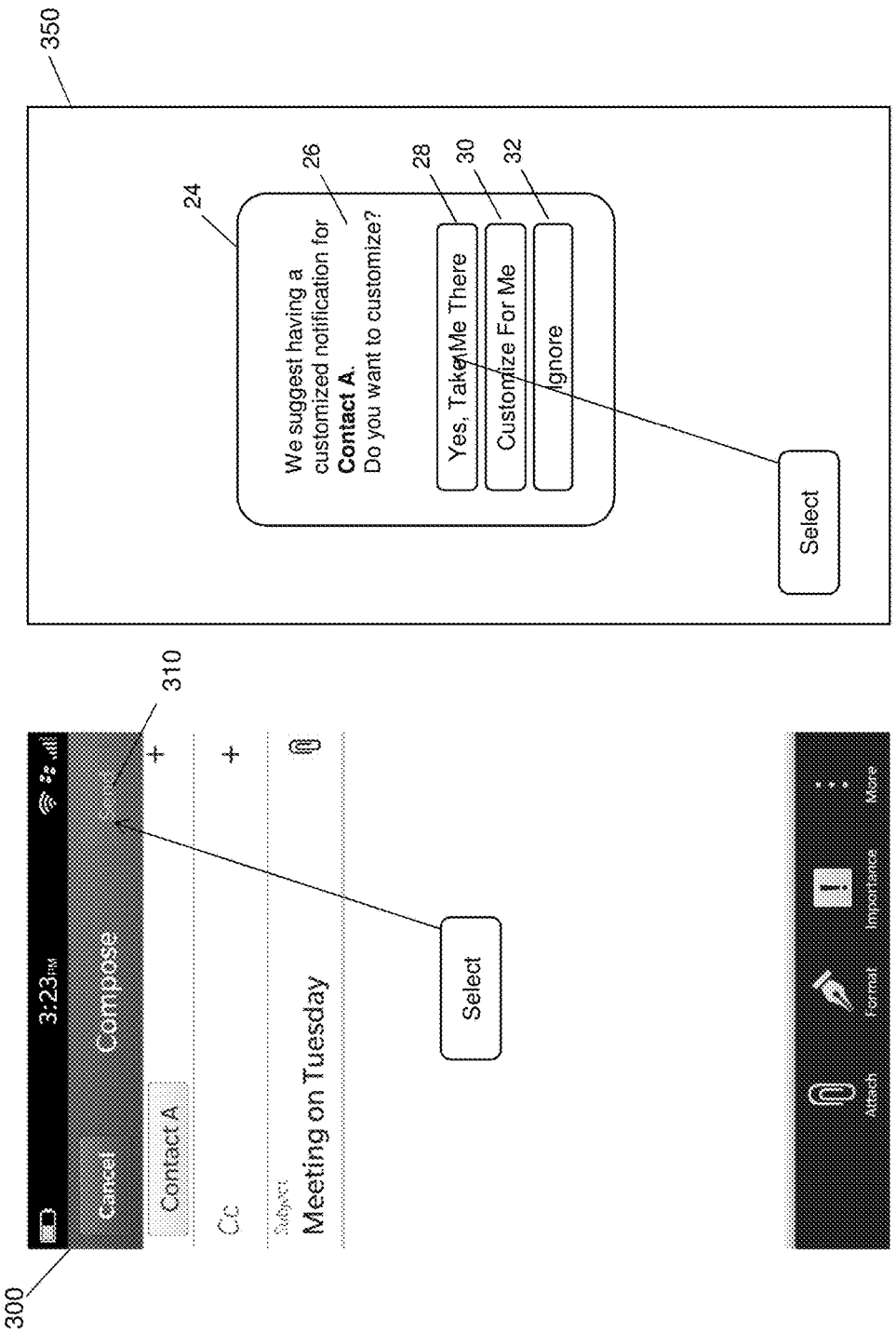

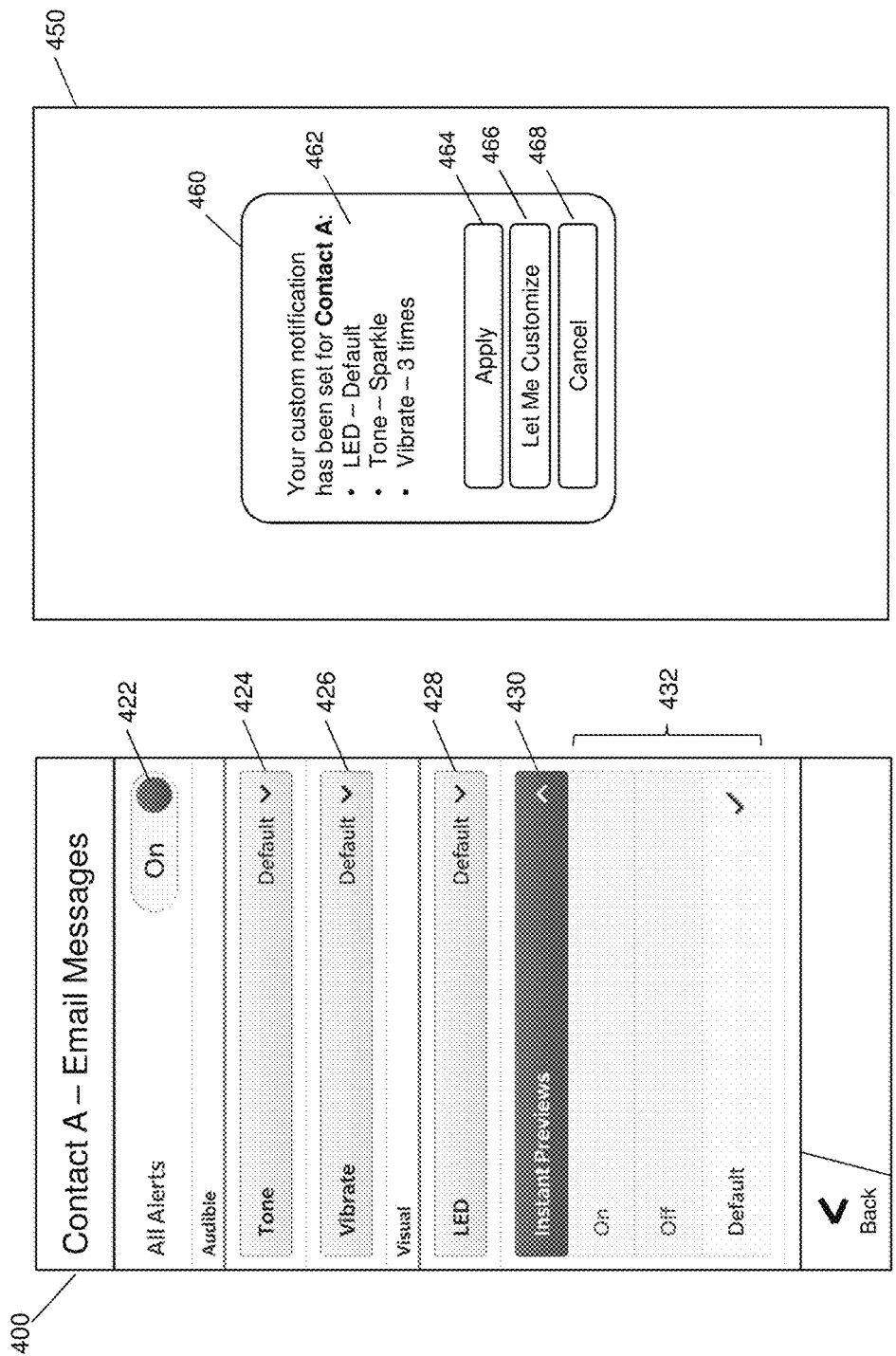

SYSTEM AND METHOD FOR ENABLING CUSTOMIZED NOTIFICATIONS ON AN ELECTRONIC DEVICE

TECHNICAL FIELD

The following relates to systems and methods for enabling customized notifications on electronic devices.

DESCRIPTION OF THE RELATED ART

Electronic communication devices are increasingly used for many types of messaging and other communications, including email, voice/video messaging, phone calls, text messaging, instant messaging, social network messaging/posting, etc. Traditionally, such communication devices include one or more notification mechanisms such as visual, auditory, and haptic feedback mechanisms. While notification mechanisms can provide an indication of an incoming communication or other event, with the increasing number of communication types and ever larger social networks and contacts, the notification mechanisms can become ambiguous and even ineffective.

BRIEF DESCRIPTION OF THE DRAWINGS

Embodiments will now be described by way of example with reference to the appended drawings wherein:

FIG. 13 is a screen shot of a message composition user interface;

FIG. 14 is a screen shot of an example of a user interface displaying a customized notification recommendation;

FIG. 15 is a screen shot of an email messages notification customization user interface;

FIG. 16 is a screen shot of an example of a user interface displaying a custom notification confirmation;

DETAILED DESCRIPTION

Figure 2:
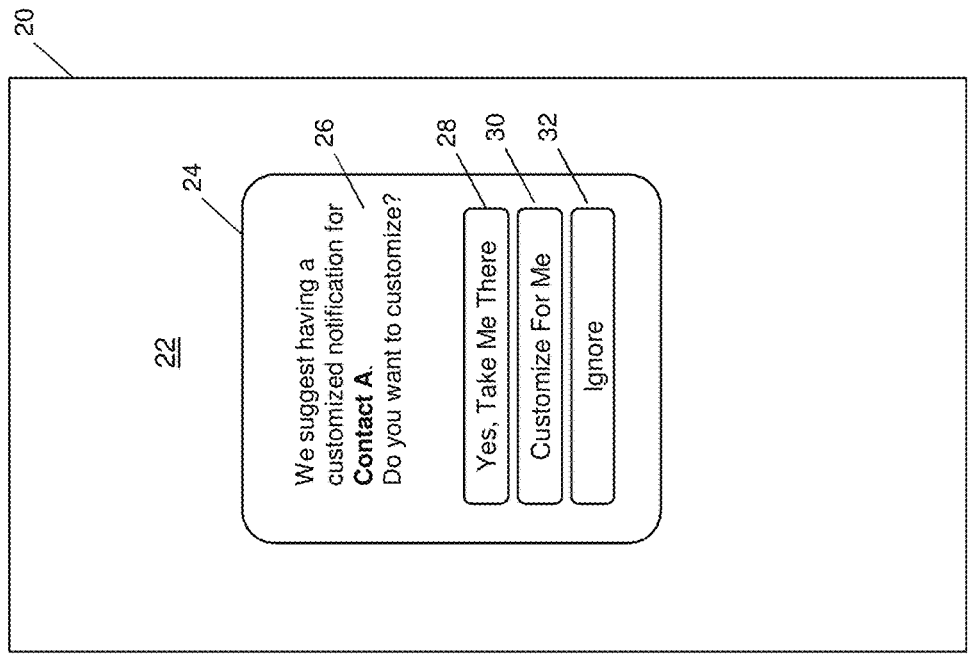
FIG. 2 is a screen shot of an example of a user interface displaying a customized notification recommendation.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

There is provided a method performed by an electronic device, the method comprising: displaying a recommendation on the electronic device to create a custom notification for at least one communication type; and enabling the custom notification to be created for the at least one communication type.

There is also provided an electronic device comprising a processor, a display and a memory, the memory comprising computer executable instructions for causing the processor to operate the electronic device, computer executable instructions for: displaying a recommendation on the electronic device to create a custom notification for at least one communication type; and enabling the custom notification to be created for the at least one communication type.

There is also provided computer executable instructions stored on a non-transitory computer readable medium, the computer executable instructions comprising instructions for: displaying a recommendation on the electronic device to create a custom notification for at least one communication type; and enabling the custom notification to be created for the at least one communication type.

It has been recognized that usage data and other information concerning interactions and communications between a device and contacts, groups of contacts, other entities, and applications or services can be leveraged to intelligently determine an appropriate time to recommend to a user of the device that the user create (or have created) a custom notification for the contact, group, other entity, application or service. Moreover, to encourage usage of the customization features, the recommendation can either facilitate automatically generated customizations, navigate the user into the appropriate user interface(s) to manually create a customization, or both. It has also been recognized that intelligently determining an appropriate time to recommend usage of a feature that may not otherwise be known to a user or routinely used, discoverability and "stickiness" of the feature can be encouraged.

Figure 1:
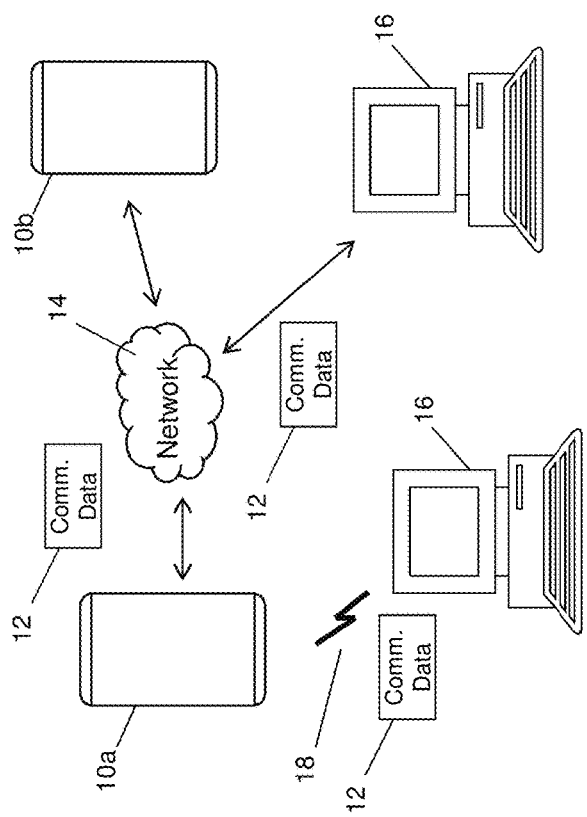
FIG. 1 is a schematic diagram of a configuration for an example of a communication system.

FIG. 1 illustrates an example of a communication system in which a first mobile device 10a communicates communication data 12 with a second mobile device 10b over a network 14 such as the internet, cellular network, etc. In the example shown in FIG. 1, the first mobile device 10a is also configured to be able to communicate over a short-range communication connection 18 with other devices, in this example a desktop computer 16 is shown for illustrative purposes. Similarly, the mobile devices 10a, 10b may also be configured to communicate with other devices such as a desktop computer 16 via the network 14. The short-range communication connection 18 can be any available communication link for which the devices 10a, 16 are configured, such as Bluetooth, WiFi, infrared, near field communications (NFC) and the like.

The communication data 12 and other data associated with the communication data 12 such as data logs, network traffic reports, etc. can be used to established usage data and/or other information that is indicative of a pattern of communication with a contact, group of contacts, or other entity. The usage data may also be associated with usage of particular applications. As discussed above, it has been found that such usage data can be leveraged to intelligently determine an appropriate time to recommend to a user that the user create (or have created) a custom notification for the contact, group, other entity, or application. For example, usage data indicative of frequent communications using several media with a particular contact can be used to determine that the contact is a "close" contact for which a custom notification should be made to allow the user to more easily distinguish communications with that contact from other communication traffic. Similarly, usage data indicative of frequent usage of a particular application can be used to determine that the application is "heavily used" and for which a custom notification should be made to allow the user to more easily distinguish communications associated with that application.

FIG. 2 illustrates a screen shot 20 of a mobile device user interface 22 and a recommendation prompt 24 that is displayed after detecting a pattern or one or more criteria with respect to communications between the mobile device 10 and Contact A. The recommendation prompt 24 in this example includes a message 26 identifying the recommendation as being directed towards creating customized notifications for Contact A, and inviting the user to create a customization. As discussed above, to encourage usage of the customization features, the recommendation prompt 24 can either facilitate the automatic generation of customizations, navigate the user into the appropriate user interface(s) to manually create a customization, or both. In the example shown in FIG. 2, a navigation option 28 is provided ("Yes, Take Me There") to enable the user to navigate into the customization screen(s), an auto-customize option 30 is provided to enable the user to have a customized notification created for them, and an ignore option 32 is provided to enable the user to disregard the recommendation altogether.

It can be appreciated from FIG. 2 that the recommendation prompt 24 can be triggered and displayed in conjunction with any user interface 22 under predetermined conditions. For example, the recommendation prompt 24 can be triggered based on analyzed usage data and displayed when the user is passively using the device (e.g., while viewing/scrolling versus composing a message or being engaged in a voice or video communication). It can also be appreciated that while the example shown in FIG. 2 is related to a contact-based customization, the principles discussed herein equally apply to application-based customizations.

Figure 3:
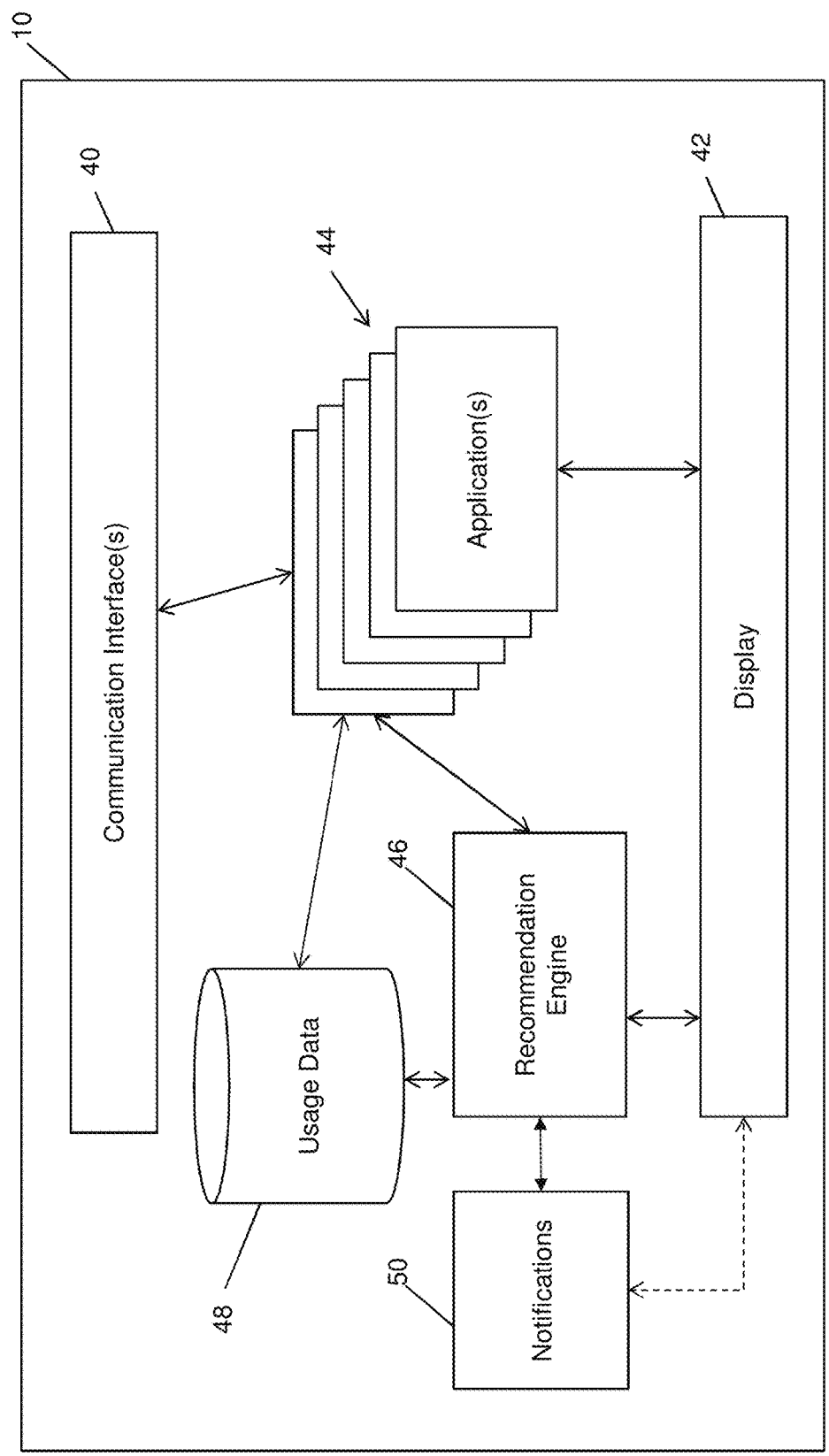
FIG. 3 is a block diagram of an example of a configuration for a mobile device having a recommendation engine.

FIG. 3 illustrates an example of a configuration for a mobile device 10. The mobile device 10 includes one or more communication interfaces 40 to enable the mobile device 10 to communicate with other devices, services, and domains, e.g. to communicate via the wireless network 30, and short-range communication connection 38 shown in FIG. 1. The one or more communication interfaces 40 in this example generally represents any one or more short-range, wide-area, wired, or wireless communication connection utilizing a connection, radio, etc. The mobile device 10 also includes a display component 42, which may be used by various applications 44 and services on the mobile device 10 including a recommendation engine 46 as illustrated in FIG. 3. The recommendation engine 46 includes or otherwise has access to locally-stored usage data 48 for storing and/or caching data and information indicative of patterns or other characteristics associated with communications between the user of the mobile device 10 and contacts, groups of contacts, and/or entities, and/or usage of particular ones of the applications 44. The recommendation engine 46 is also communicable with a notifications module 50, which is configured to apply one or more notification mechanisms. For example, the notifications module 50 may be configured to selectively utilize different colored LEDs, various tones, and various vibration patterns. Other visual indicators can also be provided using the display 52 as shown in FIG. 3, for example using instant previews (discussed below). It can be appreciated that the delineations shown in FIG. 3 are for illustrative purposes only. For example, the recommendation engine 46 may also be incorporated into functionality provided by the notifications module 50 and vice versa. Similarly, the usage data 48 may also be integrated into the notifications module 50 or recommendation engine 46.

Figure 4:
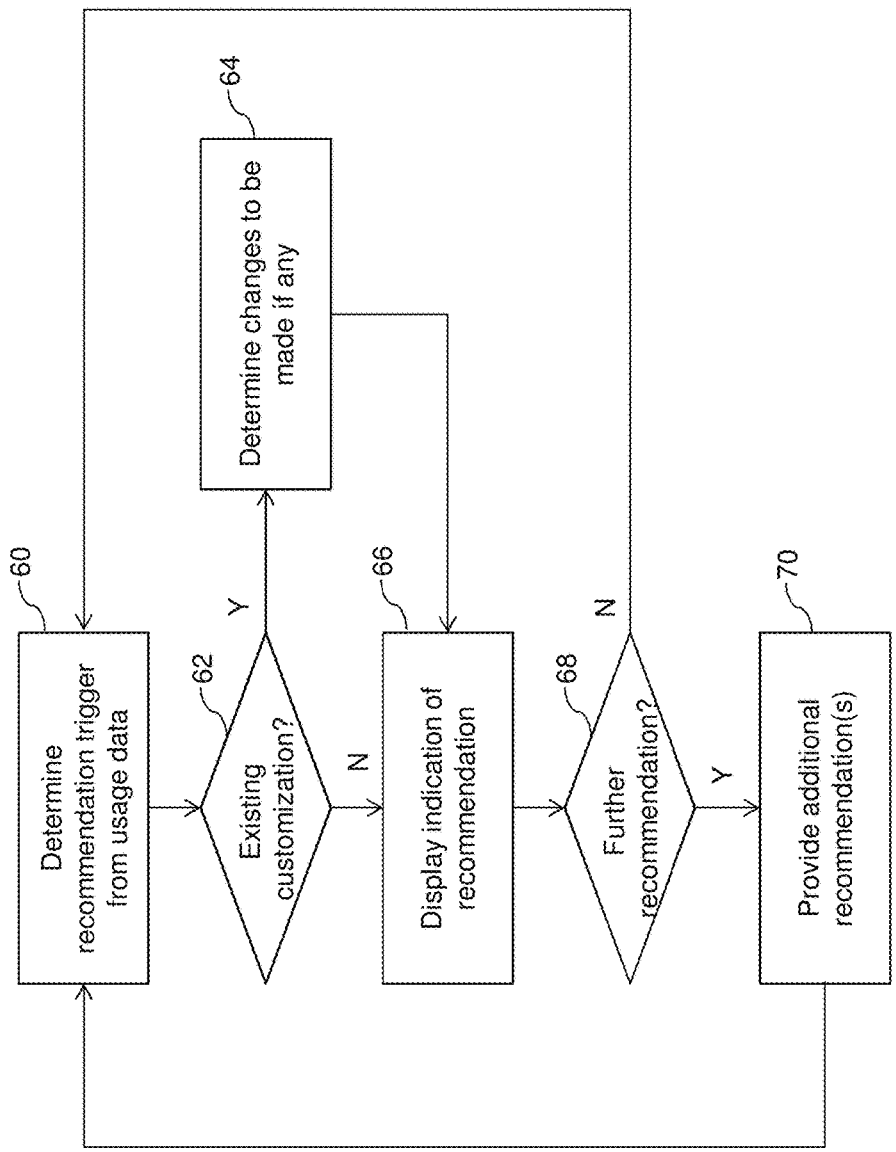
FIG. 4 is a flow chart illustrating example computer executable operations that may be performed in generating and displaying a customized notification recommendation.

FIG. 4 illustrates example computer executable operations that may be performed by the recommendation engine 46 in generating a recommendation associated with customized notifications in one example. At 60 the recommendation engine 46 determines a recommendation trigger from the usage data, e.g., by detecting a pattern or other criterion indicative of frequent/repeatable/predictable usage of an application or frequent/repeatable/predictable communications with a contact, group, or other entity. The recommendation engine 46 determines at 62 whether or not the recommendation trigger is associated with a contact, group, other entity, or application for which a customization already exists. If so, any changes to be made to the existing customization, if any, are determined at 64. For example, applications may be customized as being "heavy", "medium", and "light" for usage, with a different LED notification used depending on which designation. Upon determining that a particular application is used relatively more or less than the previous determination can trigger a change to be made to a previously recommended customized notification.

At 66 the recommendation engine 46 displays an indication of a recommendation, e.g., by using a prompt 24 as shown in FIG. 2 or using another visual indicator or cue as will be discussed in greater detail below. Some recommendation triggers can generate further recommendations. For example, a recommendation for customizing notifications for a particular contact that is within a group may cause a further recommendation to harmonize or apply similar customizations to the rest of the group. At 68 the recommendation engine 46 determines if such a further recommendation is appropriate. If not, the process returns to 60 to determine a further recommendation trigger. If a further recommendation is appropriate, the recommendation engine provides such an additional recommendation at 70.

Figure 6:
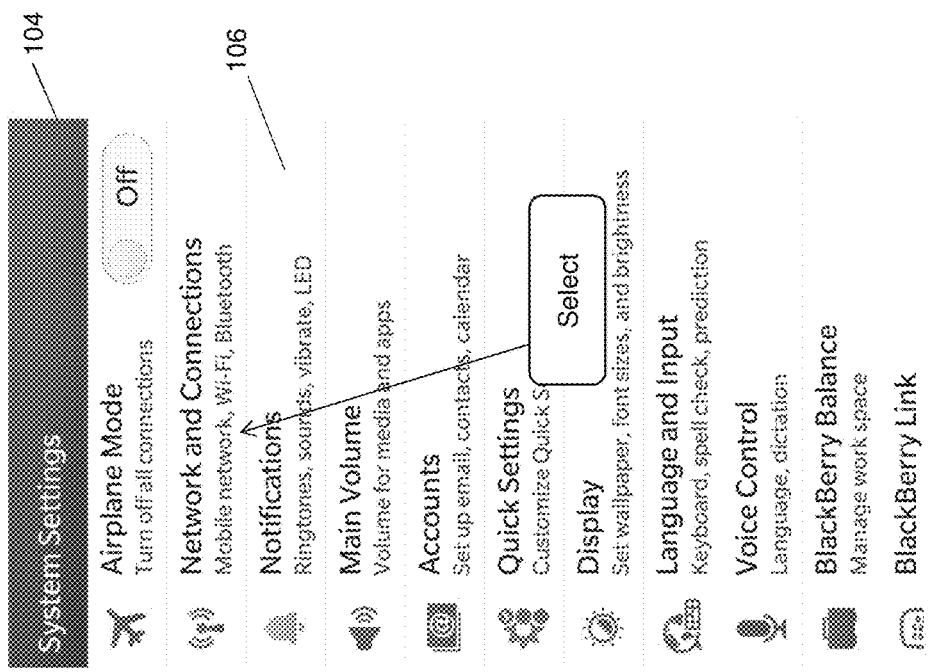
FIG. 6 is a screen shot of a system settings user interface.
Figure 5:
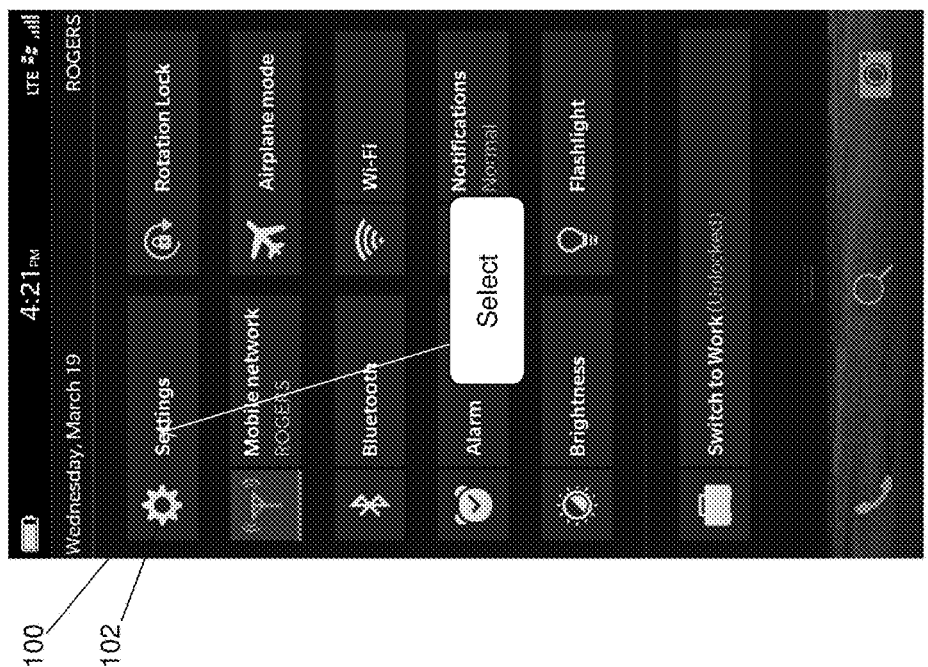
FIG. 5 is a screen shot of a user interface displaying an options menu.
Figure 7:
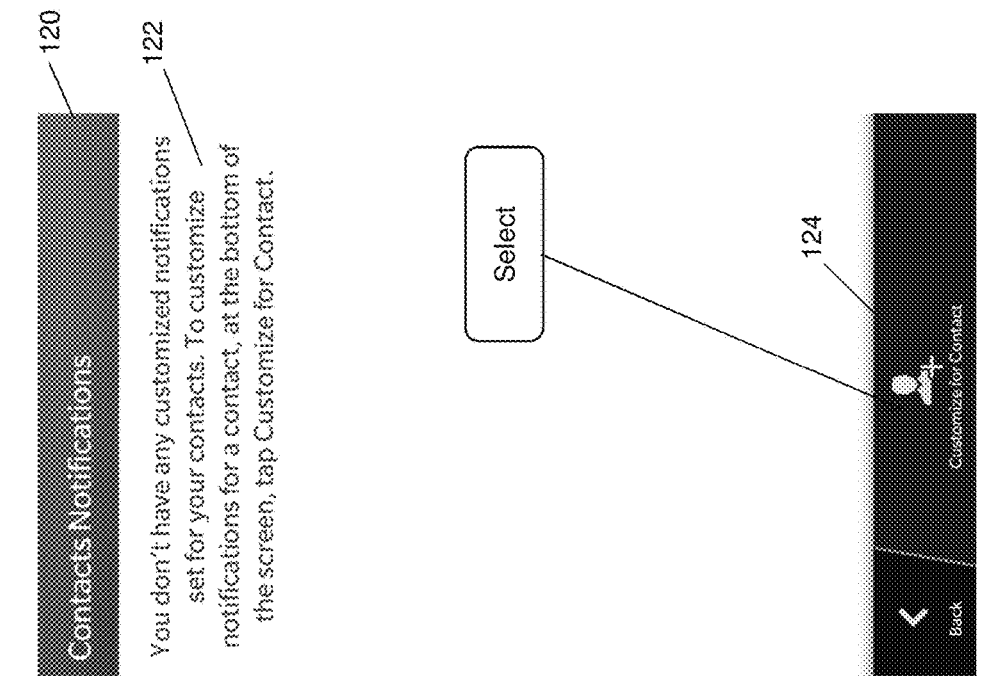
FIG. 7 is a screen shot of a notifications user interface.

Turning now to FIGS. 5 to 12, various screen shots are illustrated to demonstrate user interfaces interacted with for creating customized notifications. FIG. 5 illustrates an options user interface 100, which may be displayed upon detecting an input such as a swipe gesture. In this example, the options user interface 100 includes a settings option 102, which when selected, causes a system settings user interface 104 to be displayed as shown in FIG. 6. The system settings user interface 104 includes a notifications option 106, which when selected, causes a notifications user interface 108 to be displayed as shown in FIG. 7. The notifications user interface 108 includes a customization portion 110, which in this example includes a contacts customization option 112, and an applications customization option 114. As can be appreciated from FIGS. 5 to 7, specialized options such as those enabling the customization of notifications may require several user interface interactions in order to navigate into the appropriate screen, thus impacting on the potential usage of the feature. As discussed above, it has been found that intelligently determining an appropriate time to recommend usage of a feature that may not otherwise be known to a user or routinely used, discoverability and "stickiness" of the feature can be encouraged.

Figure 8:
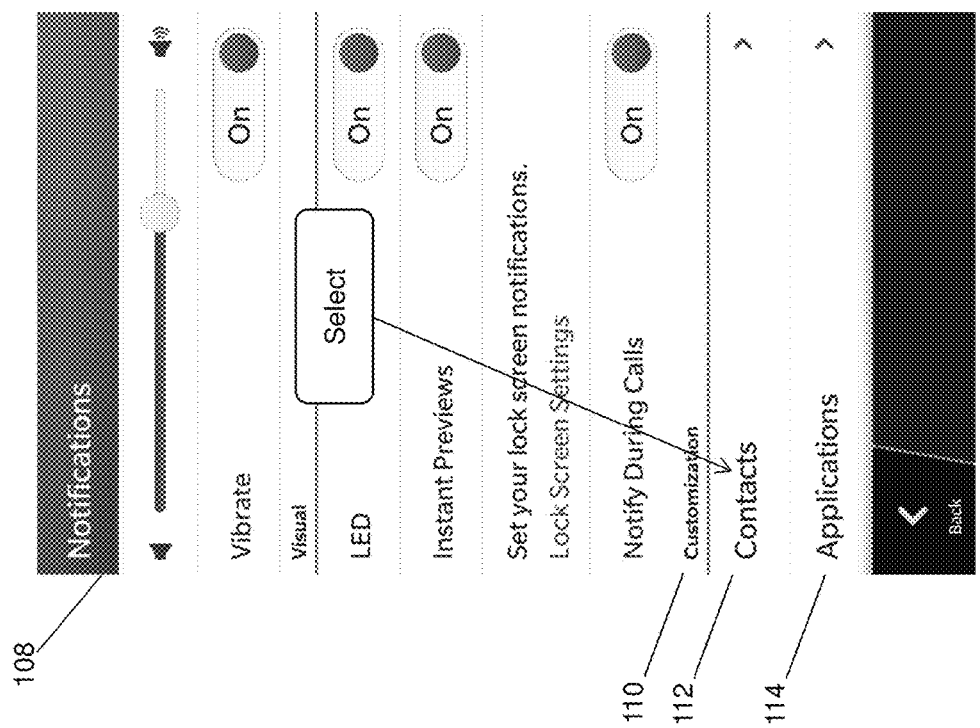
FIG. 8 is a screen shot of a contacts custom notifications user interface.
Figures 9, 10:
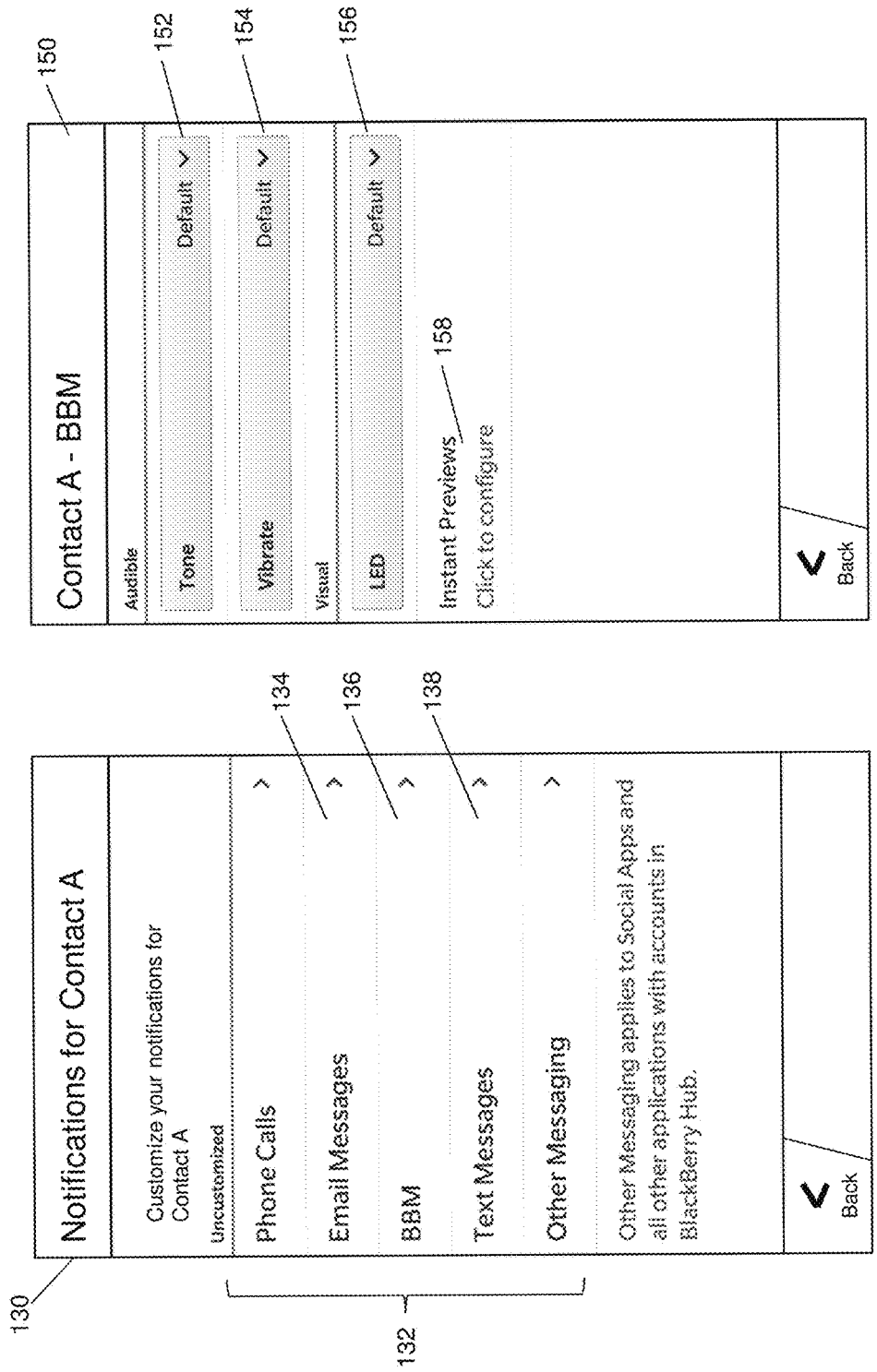
FIG. 9 is a screen shot of a notifications selection user interface.
FIG. 10 is a screen shot of an instant messaging notification customization user interface.

By selecting the contacts customization option 112 as shown in FIG. 7, a contacts notification user interface 120 may be displayed as shown in FIG. 8. The contacts notification user interface 120 can be used to itemize previously created customizations for particular contacts, e.g., to enable editing or removal of such customizations. In the example shown in FIG. 8 no existing contact customizations have been made. By selecting a customize option 124 as illustrated, a contact selection or contact search mechanism (not shown) can be provided to enable the contact to be identified. In this example, "Contact A" has been selected, as shown in FIG. 9. For a particular contact, various applications can be individually customized as shown in FIG. 9. A list of customizable applications 132 is provided, which in this example includes, among others, email messages listing 134, BBM (instant messaging) listing 136, and text messages listing 138. Selecting the BBM listing 136 causes an instant messaging for Contact A user interface 150 to be displayed as shown in FIG. 10. In the example shown in FIG. 10, audible and visual notification mechanisms can be customized. Audible notifications mechanisms include a tone option 152, and a vibrate option 154, and visual options include an LED option 156. As illustrated in FIG. 10, each mechanism can be selected to enable the selection of one of a plurality of options. For example, selection of the vibrate option 154 can display a drop-down menu (not shown) providing options to select "Off", "Default", "1 time", "2 times", etc.

Figure 12:
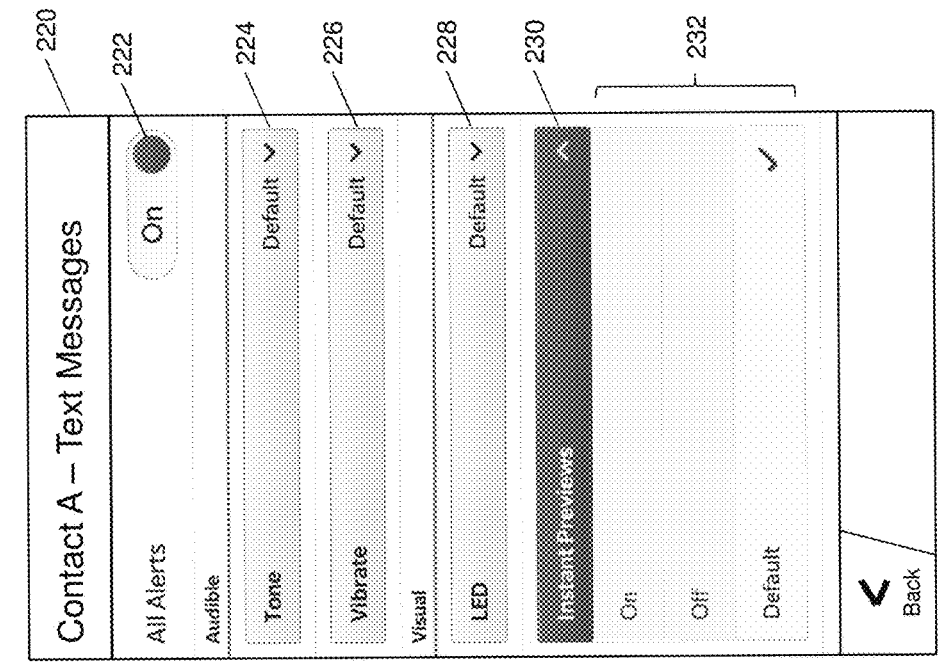
FIG. 12 is a screen shot of a text messaging notification customization user interface.
Figure 11:
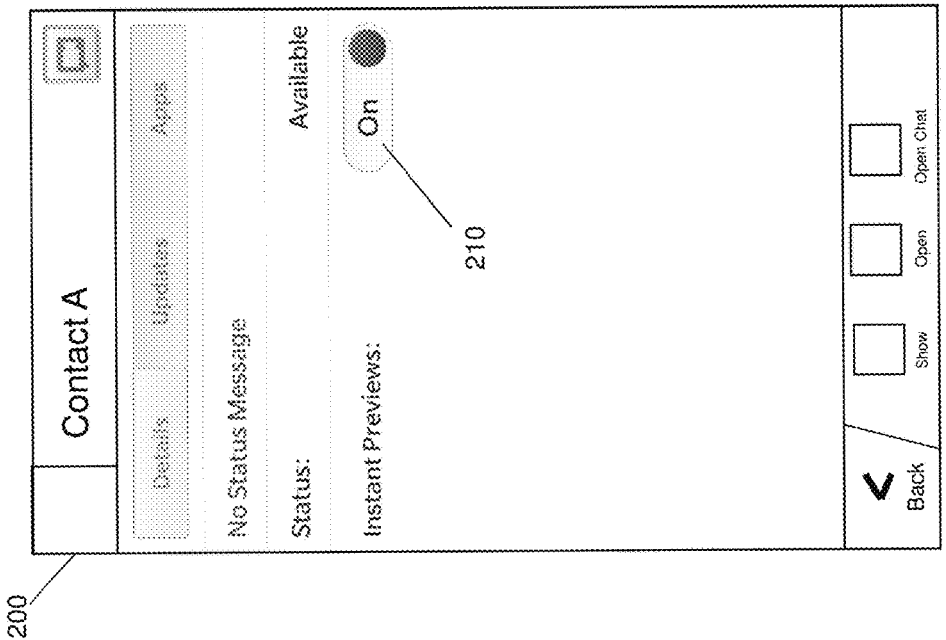
FIG. 11 is a screen shot of an instant previews customization user interface.

An instant previews option 158 is also shown in FIG. 10, which when selected causes an instant messaging user interface for Contact A to be displayed as shown in FIG. 11, with a selectable instant previews option 210. The instant previews option 210 can be used to further customize visual alerts that provide a message preview or notification of a new message for particular messaging applications 44 such as instant messaging. For example, upon reviewing a new incoming message, an instant preview of the message is displayed in any user interface that the user is currently viewing. FIG. 12 illustrates a text messages for Contact A user interface 220 which includes a pull-down mechanism for the instant previews option 230, which when selected displays a list 232 of instant preview options. As shown in FIG. 12, the text messaging customization options include an all alerts option 222, a tone option 224, a vibrate option 226, and an LED option 228, similar to that for instant messaging.

Turning now to FIG. 13, a message composition user interface 300 is shown for communicating with Contact A. In this example it is assumed that after composing a message in the user interface 300 and selecting a send option 310, the recommendation engine 46 determines that Contact A is being frequently communicated with and a recommendation is warranted. FIG. 14 illustrates a generic user interface 350 to exemplify that the recommendation prompt 24 can be displayed in any user interface at any time, e.g., a messaging application or message hub after a message to Contact A has been sent. The recommendation prompt 24 could also be triggered upon receiving a reply to the message composed in FIG. 13 and be displayed in a message inbox user interface or elsewhere.

By selecting the navigation option 28 as shown in FIG. 14, an email messages customization for Contact A user interface 400 is displayed as shown in FIG. 15. In this way, not only is a customization recommendation made, but the user is also brought directly to the relevant user interface, thus increasing discoverability of the customization features and minimizing the user effort to navigate into the user interface therefor.

By selecting the auto-customize option 30, a further confirmation prompt 460 is displayed as shown in FIG. 16. The confirmation prompt 460 indicates to the user a suggested combination 462 of customization options, in this example a default LED settings, a "Sparkle" tone, and vibrate 3 times. The confirmation prompt 460 enables the user to preview the automatically generated customization and provides an apply option 464 to enable acceptance of the suggestion. A navigation option 466 is also provided in this example to enable the user to opt to navigate to the relevant customization user interface to make their own selections (or to edit the suggested combination). A cancel option 468 is also provided to enable the user to decline the recommendation.

Figure 17:
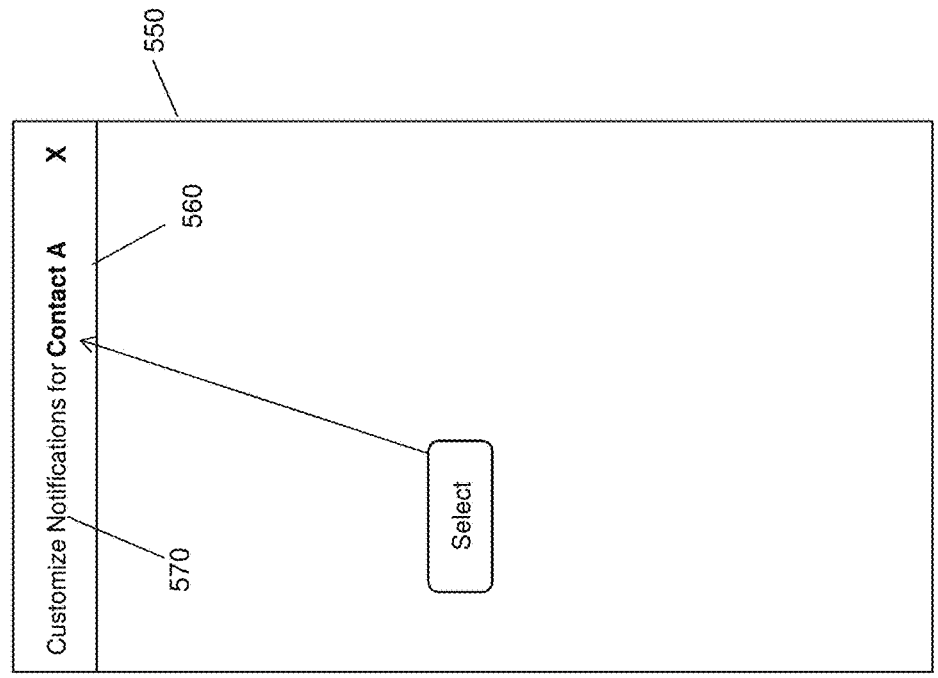
FIG. 17 is a screen shot of an example of a user interface displaying a customized notification recommendation enabling a sliding transition to a customization user interface.
Figure 18:
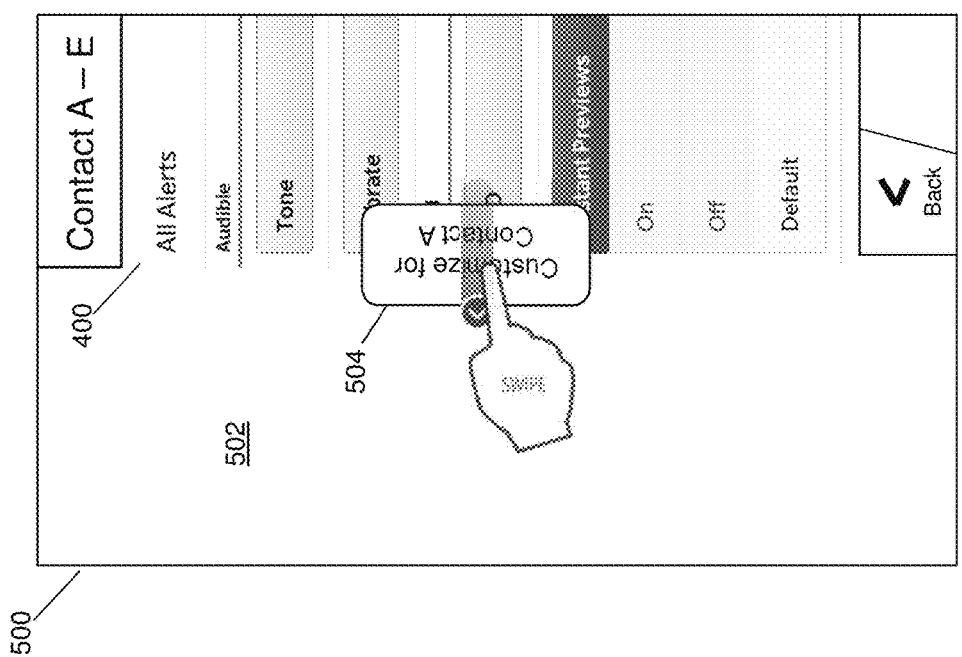
FIG. 18 is a screen shot of an example of a user interface displaying a customized notification recommendation using a message notification.

Various other mechanisms can be used to provide a customization recommendation. For example, as shown in FIG. 17, a visual cue such as a tab 504 can be displayed, which when interacted with can be used to trigger a prompt as shown in FIG. 14 or 16 or a direct navigation to the associated customization user interface as illustrated in FIG. 17, in this example by applying a swipe gesture to the tab 504 to reveal the email messages customization user interface for Contact A 400. In another example, shown in FIG. 18, an instant preview 560 or other displayed notification or indication provided in a user interface 550 may be used to provide a recommendation 560 (e.g., to customize notifications for Contact A in this example). Selecting the instant preview 560 as shown in FIG. 18 can trigger a prompt as shown in FIG. 14 or 16 or a direct navigation to the associated customization user interface.

Figure 19:
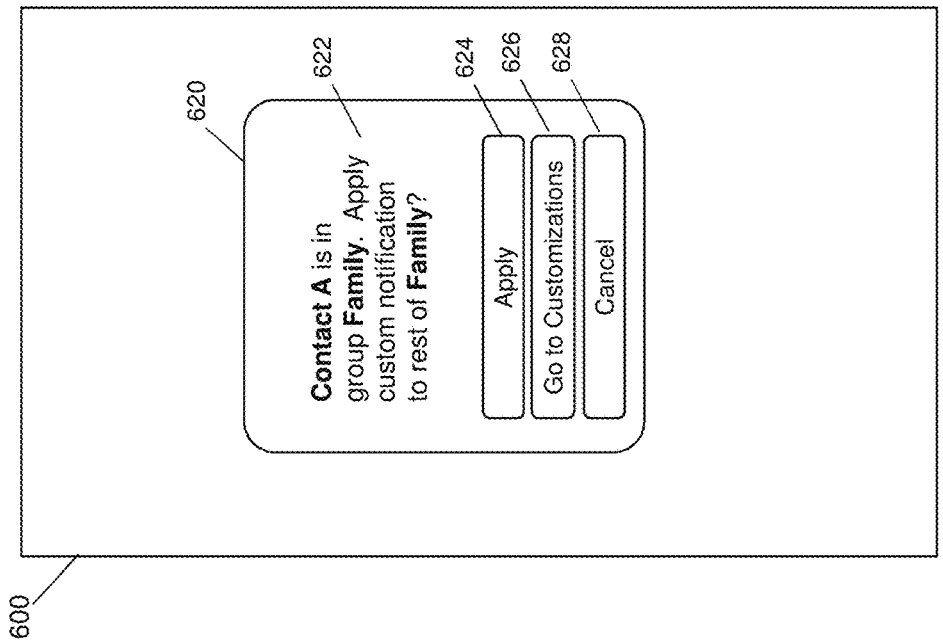
FIG. 19 is a screen shot of an example of a user interface displaying a customized notification recommendation for a group of related contacts.

As discussed above, additional recommendations can also be triggered in association with a recommendation to customize notifications for a contact or application. For example, as shown in FIG. 19, a group recommendation prompt 620 may be displayed in a user interface 600 providing a further recommendation 622. In this example, the recommendation engine 46 determines that Contact A is associated with a frequently used group and suggests applying the custom notification selected for Contact A to the rest of the group. An apply option 624 is provided to enable the user to accept this further recommendation, a navigation option 626 is provided to enable the user to navigate into the associated customization user interface, and a cancel option 628 is provided to enable the further recommendation to be declined. It can be appreciated that any other suitable display mechanism can be used to indicate the further recommendation, for example, an instant preview, tab, etc.

Figure 20:
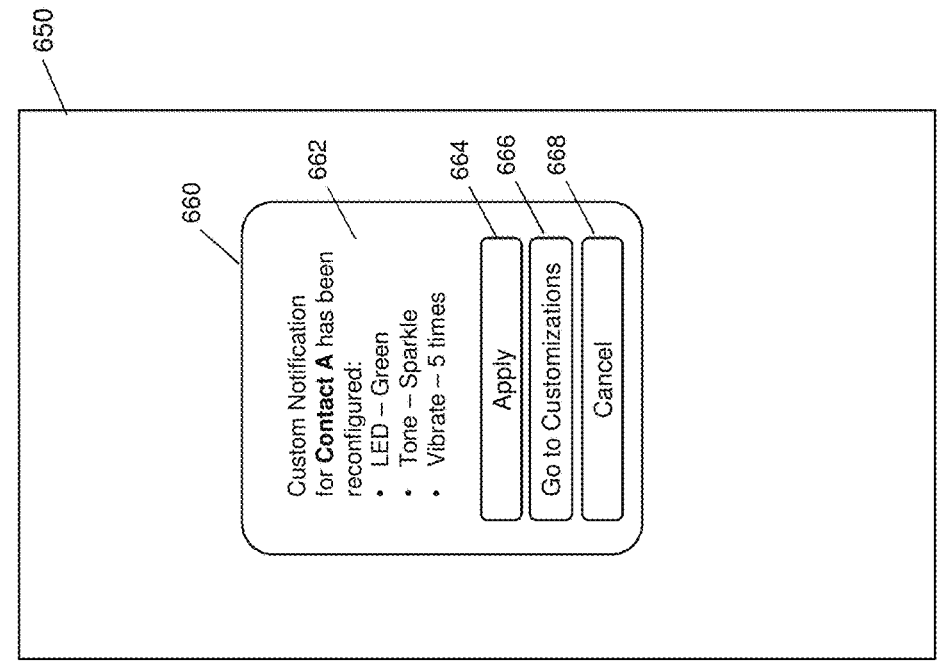
FIG. 20 is a screen shot of an example of a user interface displaying a reconfigured customized notification.

As also discussed above, the recommendation engine 46 can be configured to periodically re-evaluate custom notification settings, e.g., to make recommendations to revise or remove particular customizations, or to automatically apply such changes or deletions. For example, if a contact is associated with a group and custom notifications applied to another member of the group have been recommended for the previously customized contact, the recommendation engine 46 can be triggered to revise the previously applied settings. FIG. 20 illustrates a revised customization prompt 660, which includes a revised list of customization options 662 that have been applied. An apply option 662 is provided to enable the user to accept this revised customization, a navigation option 666 is provided to enable the user to navigate into the associated customization user interface, and a cancel option 668 is provided to enable the revised customization to be declined. It can be appreciated that any other suitable display mechanism can be used to indicate the further recommendation, for example, an instant preview, tab, etc.

Figure 21:
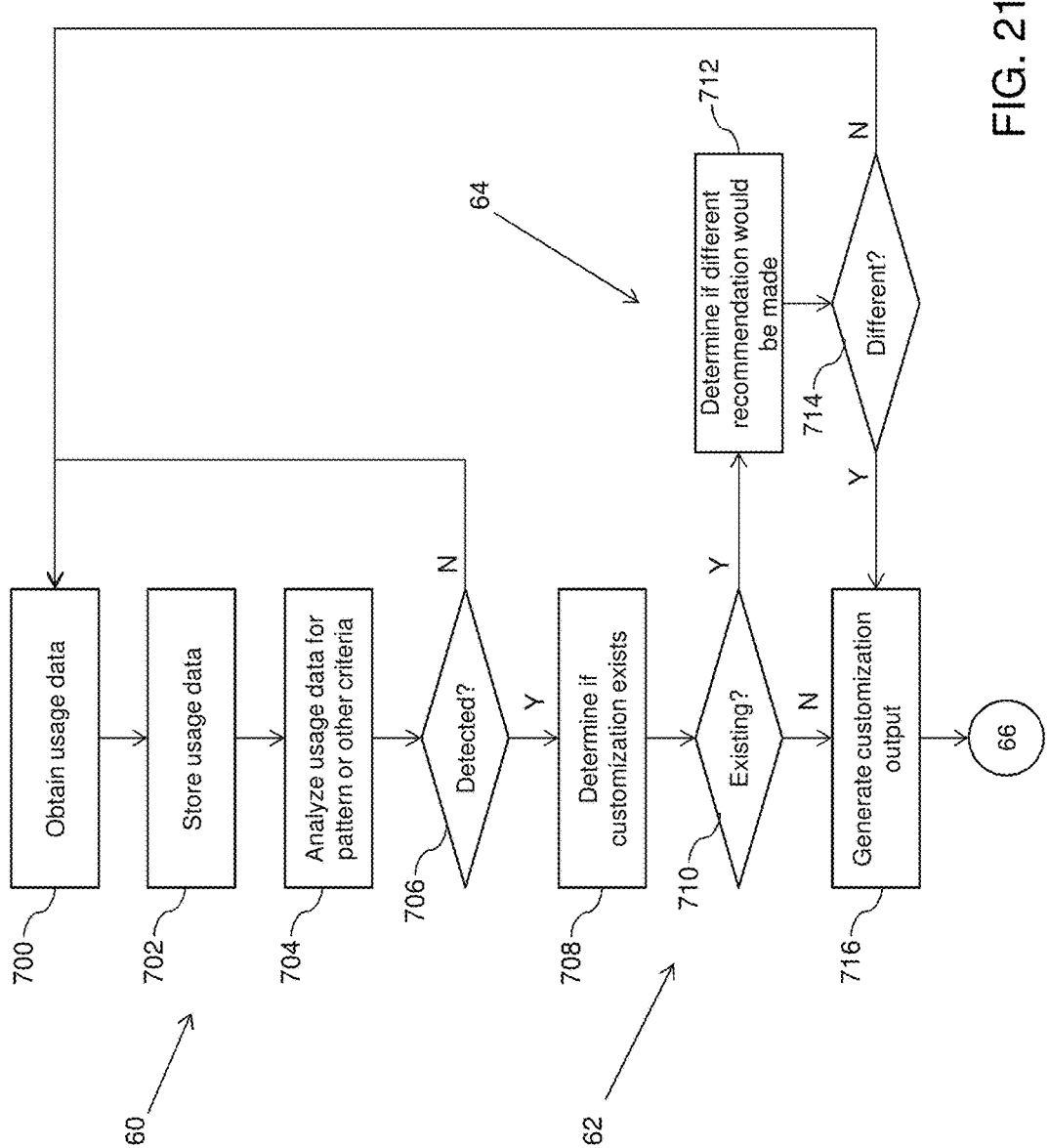
FIG. 21 is a flow chart illustrating example computer executable operations that may be performed in generating a recommendation for a customized notification.

FIG. 21 illustrates example operations that may be executed by the recommendation engine 46 in determining when to trigger a recommendation output such as a prompt, tab, instant preview, etc. At 700, the mobile device 10 obtains usage data 48, which is stored at 702. The recommendation engine 46 analyzes the usage data at 704 to determine if a pattern or other criterion has been met triggering a recommendation at 706. For example, a predetermined frequency or volume of communications with a contact/group or interactions with an application can be used to trigger a recommendation. If no such triggers are detected, further usage data can be obtained until a trigger is detected at 706. When a recommendation trigger is detected, the recommendation engine 46 determines at 708 and 710 if a customization for the contact/group/entity/application already exists. If so, the recommendation engine 46 determines at 712 and 714 whether or not a different recommendation would be made, e.g., by comparing a new set of recommended notification features to previously applied features. A customization output is generated at 716 and the process may proceed to operation 66 in FIG. 4 as shown in FIG. 21, e.g., to display a prompt, tab, instant preview, etc.

It will also be appreciated that although the above examples were illustrated using mobile devices 10, the principles discussed herein are equally applicable to any electronic device capable of sending and/or receiving communications with other devices and/or entities or correspondents.

Figure 22:
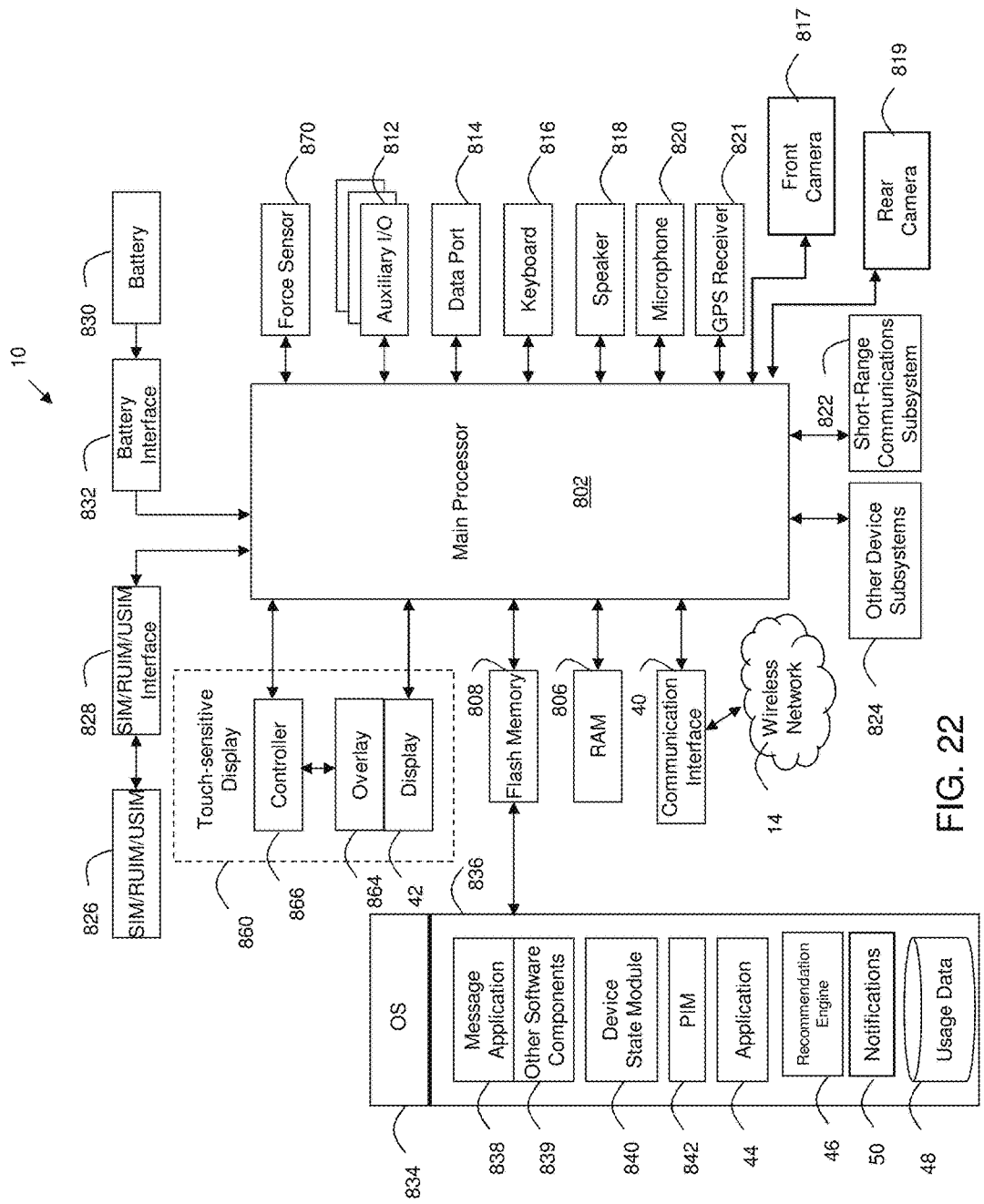
FIG. 22 is a block diagram illustrating an example of a configuration for a mobile device connectable to a wireless network.

While the principles discussed herein may be applied to any electronic device, referring now to FIG. 22, and to further aid in the understanding of the example in which mobile devices 10 are utilized, as described above, shown therein is a block diagram of an example configuration of a device configured as a "mobile device". The mobile device 10 includes a number of components such as a main processor 802 that controls the overall operation of the mobile device 10. Communication functions, including data and voice communications, are performed through at least one communication interface 40. The communication interface 40 receives messages from and sends messages to a wireless network 30'. In this example of the mobile device 10, the communication interface 40 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 40 with the wireless network 14 represents one or more different Radio Frequency (RF) channels, operating according to defined protocols specified for GSM/GPRS communications.

The main processor 802 also interacts with additional subsystems such as a Random Access Memory (RAM) 806, a flash memory 808, a touch-sensitive display 860, an auxiliary input/output (I/O) subsystem 812, a data port 814, a keyboard 816 (physical, virtual, or both), a speaker 818, a microphone 820, a GPS receiver 821, a front camera 817, a rear camera 819, short-range communications subsystem 822, and other device subsystems 824. Some of the subsystems of the mobile device 10 perform communication-related functions, whereas other subsystems may provide "resident" or on-device functions. By way of example, the touch-sensitive display 860 and the keyboard 816 may be used for both communication-related functions, such as entering a text message for transmission over the wireless network 14, and device-resident functions such as a calculator or task list. In one example, the mobile device 10 can include a non-touch-sensitive display in place of, or in addition to the touch-sensitive display 860. For example the touch-sensitive display 860 can be replaced by a display 42 that may not have touch-sensitive capabilities.

The mobile device 10 can send and receive communication signals over the wireless network 14 after required network registration or activation procedures have been completed. Network access is associated with a subscriber or user of the mobile device 10. To identify a subscriber, the mobile device 10 may use a subscriber module component or "smart card" 826, such as a Subscriber Identity Module (SIM), a Removable User Identity Module (RUIM) and a Universal Subscriber Identity Module (USIM). In the example shown, a SIM/RUIM/USIM 826 is to be inserted into a SIM/RUIM/USIM interface 828 in order to communicate with a network.

The mobile device 10 is typically a battery-powered device and includes a battery interface 832 for receiving one or more rechargeable batteries 830. In at least some examples, the battery 830 can be a smart battery with an embedded microprocessor. The battery interface 832 is coupled to a regulator (not shown), which assists the battery 830 in providing power to the mobile device 10. Although current technology makes use of a battery, future technologies such as micro fuel cells may provide the power to the mobile device 10.

The mobile device 10 also includes an operating system 834 and software components 836 to 842, 44, 46, 48, and 50. The operating system 834 and the software components 836 to 842, 44, 46, 48, and 50, that are executed by the main processor 802 are typically stored in a persistent store such as the flash memory 808, which may alternatively be a read-only memory (ROM) or similar storage element (not shown). Those skilled in the art will appreciate that portions of the operating system 834 and the software components 836 to 842, 44, 46, 48, and 50, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, may be installed on the mobile device 10 during its manufacture. Software applications may include a message application 838, a device state module 840, a Personal Information Manager (PIM) 842, an application 44, a recommendation engine 46, a notifications module 50, and usage data 48. A message application 838 can be any suitable software program that allows a user of the mobile device 10 to send and receive electronic messages, wherein messages are typically stored in the flash memory 808 of the mobile device 10. A device state module 840 provides persistence, i.e. the device state module 840 ensures that important device data is stored in persistent memory, such as the flash memory 808, so that the data is not lost when the mobile device 10 is turned off or loses power. A PIM 842 includes functionality for organizing and managing data items of interest to the user, such as, but not limited to, e-mail, contacts, calendar events, and voice mails, and may interact with the wireless network 14.

Other types of software applications or components 839 can also be installed on the mobile device 10. These software applications 839 can be pre-installed applications (i.e. other than message application 838) or third party applications, which are added after the manufacture of the mobile device 10. Examples of third party applications include games, calculators, utilities, etc.

The additional applications 839 can be loaded onto the mobile device 10 through at least one of the wireless network 16', the auxiliary I/O subsystem 812, the data port 814, the short-range communications subsystem 822, or any other suitable device subsystem 824.

The data port 814 can be any suitable port that enables data communication between the mobile device 10 and another computing device. The data port 814 can be a serial or a parallel port. In some instances, the data port 814 can be a Universal Serial Bus (USB) port that includes data lines for data transfer and a supply line that can provide a charging current to charge the battery 830 of the mobile device 10.

For voice communications, received signals are output to the speaker 818, and signals for transmission are generated by the microphone 820. Although voice or audio signal output is accomplished primarily through the speaker 818, the display 42 can also be used to provide additional information such as the identity of a calling party, duration of a voice call, or other voice call related information.

The touch-sensitive display 860 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 860 is a capacitive touch-sensitive display which includes a capacitive touch-sensitive overlay 864. The overlay 864 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 42 of the touch-sensitive display 860 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 860. The processor 802 may determine attributes of the touch, including a location of a touch. Touch location data may include an area of contact or a single point of contact, such as a point at or near a center of the area of contact, known as the centroid. A signal is provided to the controller 866 in response to detection of a touch. A touch may be detected from any suitable object, such as a finger, thumb, appendage, or other items, for example, a stylus, pen, or other pointer, depending on the nature of the touch-sensitive display 860. The location of the touch moves as the detected object moves during a touch. One or both of the controller 866 and the processor 802 may detect a touch by any suitable contact member on the touch-sensitive display 860. Similarly, multiple simultaneous touches, are detected.

In some examples, an optional force sensor 870 or force sensors is disposed in any suitable location, for example, between the touch-sensitive display 860 and a back of the mobile device 10 to detect a force imparted by a touch on the touch-sensitive display 860. The force sensor 870 may be a force-sensitive resistor, strain gauge, piezoelectric or piezoresistive device, pressure sensor, or other suitable device.

It will be appreciated that any module or component exemplified herein that executes instructions may include or otherwise have access to computer readable media (including non-transitory computer readable media) such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, cloud storage 34, any component of or related to these entities, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method performed by an electronic device, the method comprising:
   monitoring interactions at the electronic device between the electronic device and at least one other electronic device associated with a contact stored in the electronic device;
   identifying, based on monitoring the interactions, an interaction pattern of communication between the electronic device and the at least one other electronic device;
   determining that the interaction pattern matches a predefined interaction pattern, wherein the predefined interaction pattern is a trigger condition for generating a custom notification recommendation;
   in response to the interaction pattern matching the predefined interaction pattern, generating a recommendation to create a custom notification for at least one communication type associated with at least one contact, wherein the interaction pattern of communication between the electronic device and the at least one other electronic device is absent an action corresponding to creating a custom notification;
   in response to generating the recommendation, displaying the recommendation on a display of the electronic;
   enabling the custom notification to be created for the at least one communication type in response to a user input corresponding to the recommendation that has been displayed; and
   configuring one or more presentation characteristics of the custom notification in response to the enabling, wherein the electronic device generates and presents the custom notification to a user based on the one or more presentation characteristics in response to receiving a communication of the at least one communication type.

2. The method of claim 1, wherein the interaction pattern recommendation is identified using usage data associated with the at least one communication type.

3. The method of claim 1, wherein enabling the custom notification to be created comprises navigating to a custom notifications user interface.

4. The method of claim 1, wherein enabling the custom notification to be created comprises determining at least one custom notification setting.

5. The method of claim 1, wherein displaying the recommendation comprises displaying a prompt.

6. The method of claim 5, wherein the prompt provides at least one option to create a customization, comprising at least one of: an option to navigate to a custom notifications user interface, an option to generate the custom notification, and an option to decline customization.

7. The method of claim 1, wherein displaying the recommendation comprises enabling navigation into a custom notifications user interface.

8. The method of claim 7, further comprising displaying a visual indicator which when interacted with displays the custom notifications user interface.

9. The method of claim 8, wherein the visual indicator comprises a tab, selection of the tab displaying the custom notifications user interface.

10. The method of claim 8, wherein the visual indicator comprises a message preview, selection of the message preview displaying the custom notifications user interface.

11. The method of claim 1, further comprising determining that an existing custom notification exists for the at least one communication type, wherein the recommendation comprises at least one change to custom notification settings.

12. The method of claim 1, further comprising determining an additional recommendation, and displaying the additional recommendation.

13. The method of claim 12, wherein the additional recommendation identifies at least one other contact in a group of contacts to apply the same custom notification.

14. The method of claim 1, wherein the at least one communication type comprises communications with a contact or group of contacts.

15. The method of claim 1, wherein the at least one communication type comprises communications for an application.

16. An electronic device comprising a processor, a display and a memory, the memory comprising computer executable instructions for causing the processor to operate the electronic device, computer executable instructions for:
   monitoring interactions at the electronic device between the electronic device and at least one other electronic device associated with a contact stored in the electronic device;
   identifying, based on monitoring the interactions, an interaction pattern of communication between the electronic device and the at least one other electronic device;
   determining that the interaction pattern matches a predefined interaction pattern, wherein the predefined interaction pattern is a trigger condition for generating a custom notification recommendation;
   in response to the interaction pattern matching the predefined interaction pattern, generating a recommendation to create a custom notification for at least one communication type associated with at least one contact, wherein the interaction pattern of t communication between the electronic device and the at least one other electronic device is absent an action corresponding to creating a custom notification;
   in response to generating the recommendation, displaying the recommendation on the display of the electronic device;
   enabling the custom notification to be created for the at least one communication type in response to a user input corresponding to the recommendation that has been displayed; and
   configuring one or more presentation characteristics of the custom notification in response to the enabling, wherein the electronic device generates and presents the custom notification to a user based on the one or more presentation characteristics in response to receiving a communication of the at least one communication type.

17. Computer executable instructions stored on a non-transitory computer readable medium, the computer executable instructions comprising instructions executable by an electronic device for:
   monitoring interactions at the electronic device between the electronic device and at least one other electronic device associated with a contact stored in the electronic device;

identifying, based on monitoring the interactions, an interaction pattern of communication between the electronic device and the at least one other electronic device;

determining that the interaction pattern matches a predefined interaction pattern, wherein the predefined interaction pattern is a trigger condition for generating a custom notification recommendation;

in response to the interaction pattern matching the predefined interaction pattern, generating a recommendation to create a custom notification for at least one communication type associated with at least one contact, wherein the interaction pattern of communication between the electronic device and the at least one other electronic device is absent an action corresponding to creating a custom notification;

in response to generating the recommendation, displaying the recommendation on a display of the electronic device;

enabling the custom notification to be created for the at least one communication type in response to a user input corresponding to the recommendation that has been displayed; and configuring one or more presentation characteristics of the custom notification in response to the enabling, wherein the electronic device generates and presents the custom notification to a user based on the one or more presentation characteristics in response to receiving a communication of the at least one communication type.

18. The computer executable instructions of claim 17, wherein the interaction pattern recommendation is identified using usage data associated with the at least one communication type.

19. The computer executable instructions of claim 17, wherein enabling the custom notification to be created comprises navigating to a custom notifications user interface.

20. The computer executable instructions of claim 17, wherein enabling the custom notification to be created comprises determining at least one custom notification setting.

* * * * *